Patented June 1, 1954

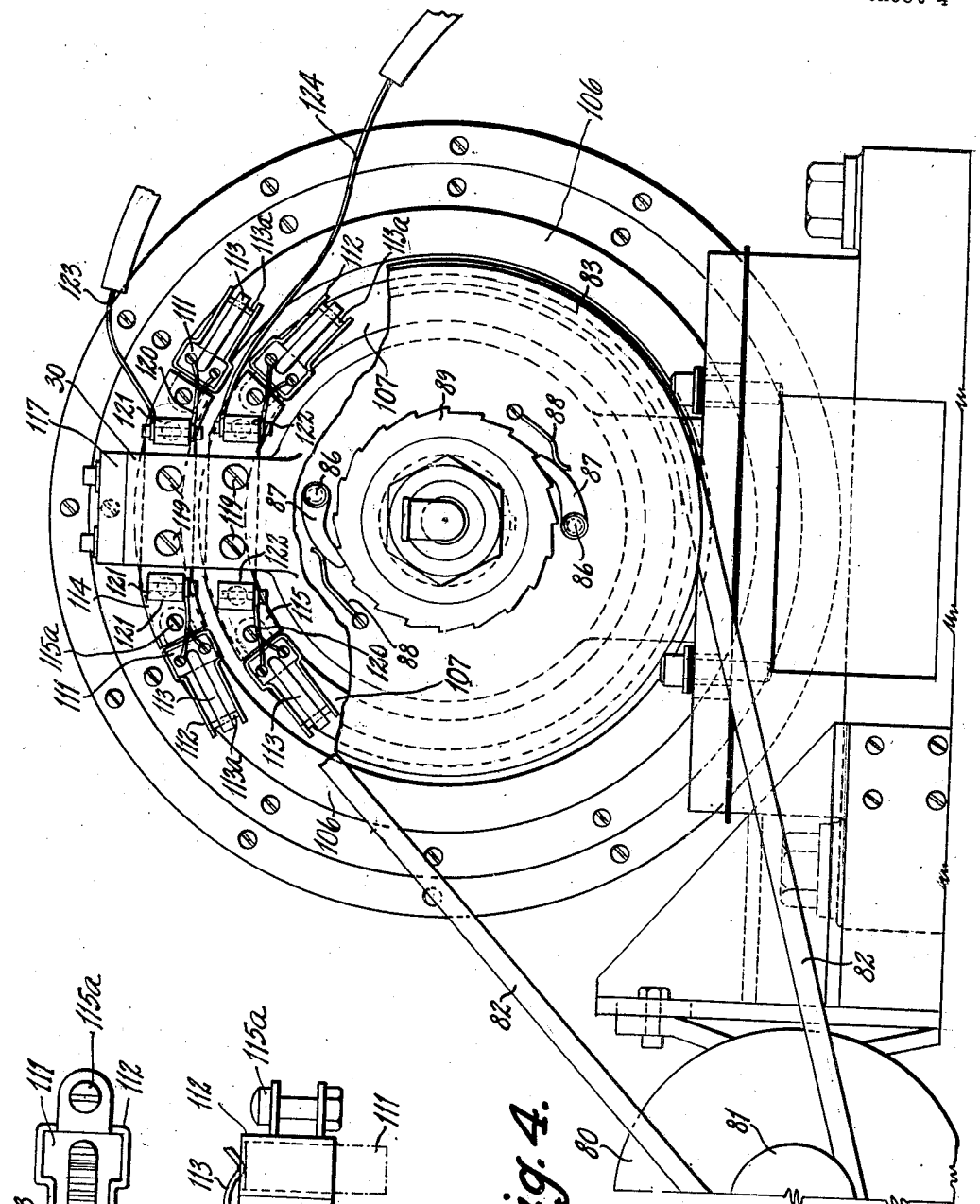

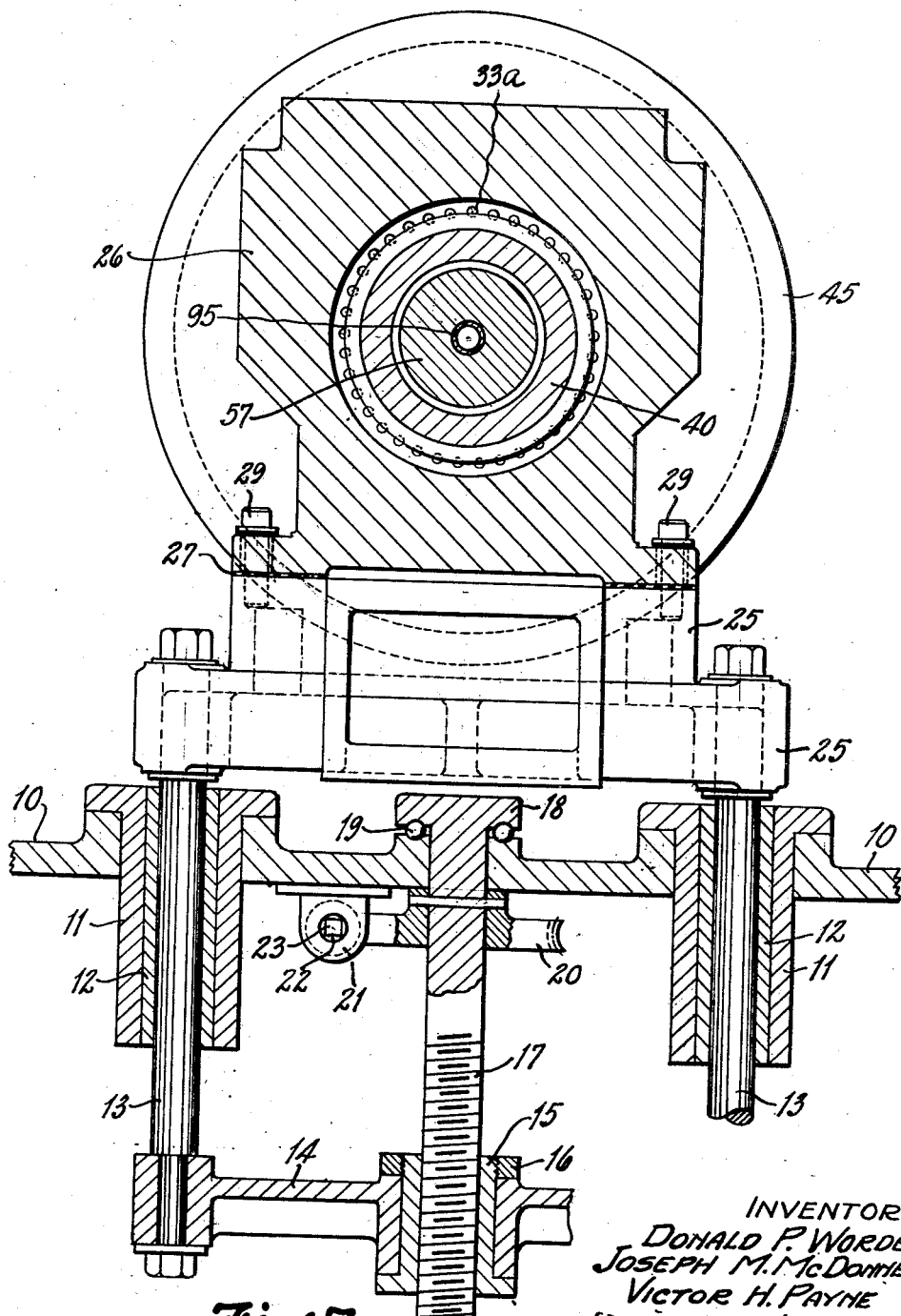

2,680,180

UNITED STATES PATENT OFFICE 2,680,180

HIGH-FREQUENCY WELDING APPARATUS

Donald P. Worden, Joseph M. McDonnell, and Victor H. Payne, Rochester, N. Y., assignors to General Motors Corporation, Detroit, Mich., a corporation of Delaware Application June 29, 1951, Serial No. 234,184

15 Claims. (Cl. 219—6)

1

This invention relates to an electrical welding apparatus and its object is to provide such an apparatus which is capable of being operated on high frequency alternating current, for example, 960 cycles.

To accomplish this object, the welder is provided with a transformer having a primary winding of improved form surrounding a core made of steel ribbon wound to form a cylinder. The steel employed is a known commercial product which is known to the trade as "Hipersil Type C." The secondary of the transformer is a single turn loop provided by concentric copper drums connected respectively, with spaced welding electrodes. These drums are of relatively large diameter and the inner drum is large enough to hold a substantial quantity of water, water being circulated continuously through the drum as the welder is used for the purpose of preventing overheating of the transformer and the electrodes.

Further objects and advantages of the present invention will be apparent from the following description, reference being had to the accompanying drawings wherein a preferred embodiment of the present invention is clearly shown.

In the drawings:

Fig. 1 is a fragmentary end view of the welder in elevation.

Figs. 2 and 3 together form a sectional view on the line 2—2 of Fig. 1.

Fig. 4 is an end view in the direction of arrow 4 of Fig. 3.

Fig. 5 is an enlarged view of one of the brush-holders shown in Fig. 4.

Fig. 6 is a view in the direction of arrow 6 of Fig. 5.

Fig. 7 is a sectional view on the line 7—7 of Fig. 2.

Figure 3:
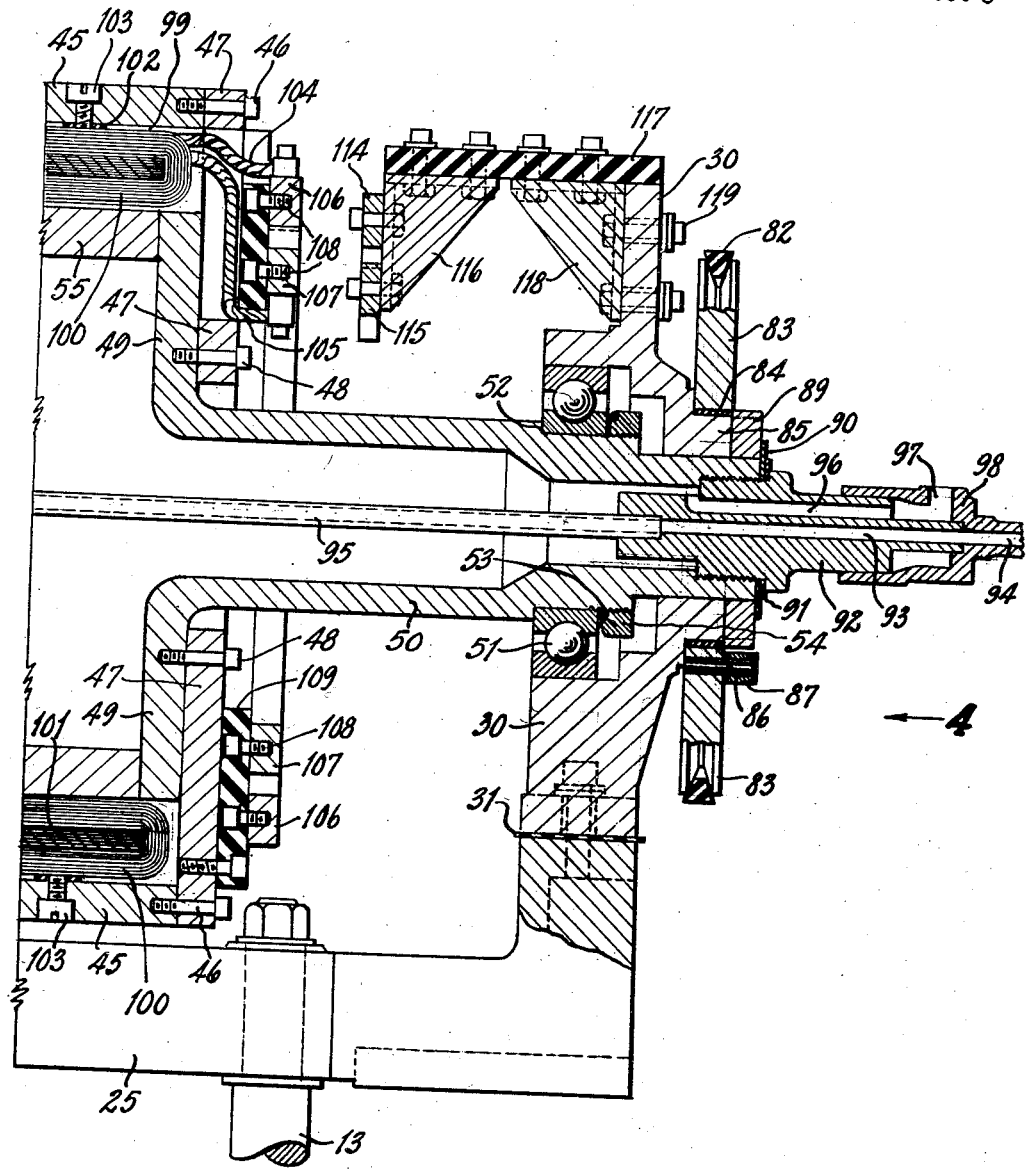

Referring to Fig. 7, a table 10 is provided by the top wall of a cabinet or base which rests upon the floor. Table 10 supports sleeves 11 in which are received bushings 12 through which vertically movable rods 13 slide. Two rods 13 are attached to a bar 14 which carries a fixed nut 15 locked against movement by nut 16. The nut 15 has threaded engagement with a screw 17 which extends through the table 10 and provides a head 18 which is supported above the table by a thrust bearing 19. Screw 17 is attached to a worm gear 20 meshing with a worm 21 attached to a shaft 22 having a square end 23 to which a removable crank is to be attached. There are two other rods 13 one of which is shown in Fig. 3, which are associated with parts identical with parts 14 to 21. Therefore, by turning the shaft 22, the four

2 rods 13 can be raised or lowered, to raise or lower a frame 25 which supports certain parts of the welding apparatus.

To this end the four rods 13 are attached to the corners of a frame 25 (Figs. 2 and 3) which supports at its left end a member 26 which supports bearings later described and is electrically insulated from frame 25 by insulators 27 and 28, while screws 29, which attach member 26 to frame 25, are insulated from said member, as shown in Fig. 7. At its right end, frame 25 supports a member 30 which is electrically insulated from frame 25 by member 31 and which carries certain bearings and other mechanism later described.

The member 26 supports tapered roller bearings 33 and 33a retained by nuts 34 and 35 provided with V grooves 36 and 37 for the purpose of preventing movement of lubricant grease from such bearings along a tubular copper shaft 40 journaled in these bearings. Shaft 40 is located axially by the bearing 33a which engages a shoulder on the shaft 40, the nut 35 and a lock washer 41 which is clamped between the inner race of bearing 33 and a nut 42 threaded on the shaft 40. The nut 42 prevents any axial movement of the bearing relative to shaft 40 and the adjustment of the nuts 34 and 35 determines the axial position of the bearing and the shaft relative to the supporting member 26.

Shaft 40 is connected by screws 44 with an outer cast copper drum 45 which is secured by screws 46 (Fig. 3) to annular copper member 47 connected by screws 48 with the flange 49 of a tubular copper shaft 50 journaled in the inner race of a ball bearing 51 supported by the member 30, said race being confined against a shoulder 52 of shaft 50 by lock washer 53 and a nut 54 threaded on shaft 50.

The flange 49 of shaft 50 is connected with an inner copper drum 55 attached to a flange 56 (Fig. 2) of a copper shaft 57 which is supported by and is located within the tubular shaft 40 in spaced concentric relation thereto, the shafts 40 and 57 being separated by a non-conducting ring 58. The shafts 40 and 57 support, respectively, copper electrodes 60 and 61 attached thereto by screws 62 and 63, respectively, threaded in the hard metal inserts 64 and 65, respectively.

Figure 1:
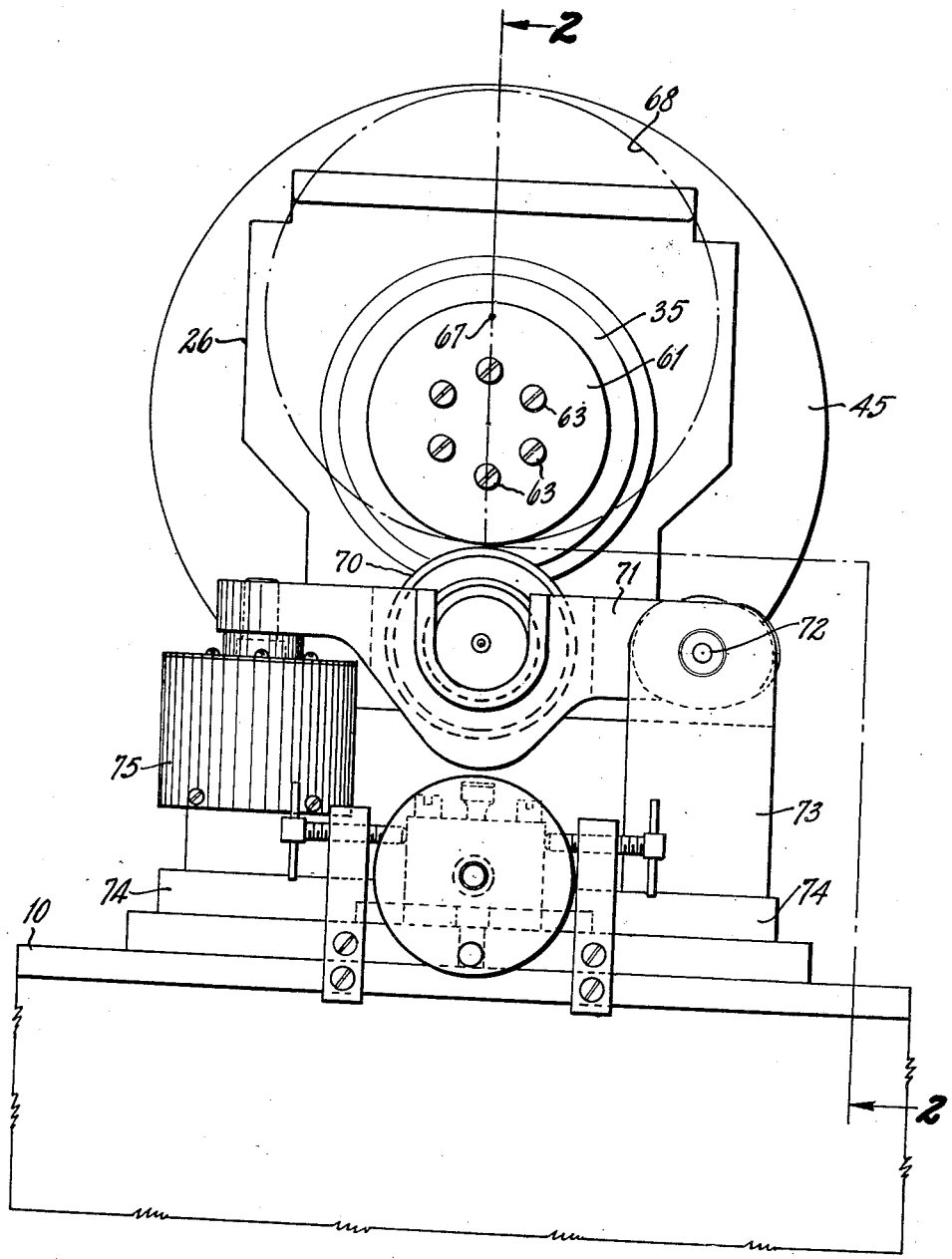
Figure 2:
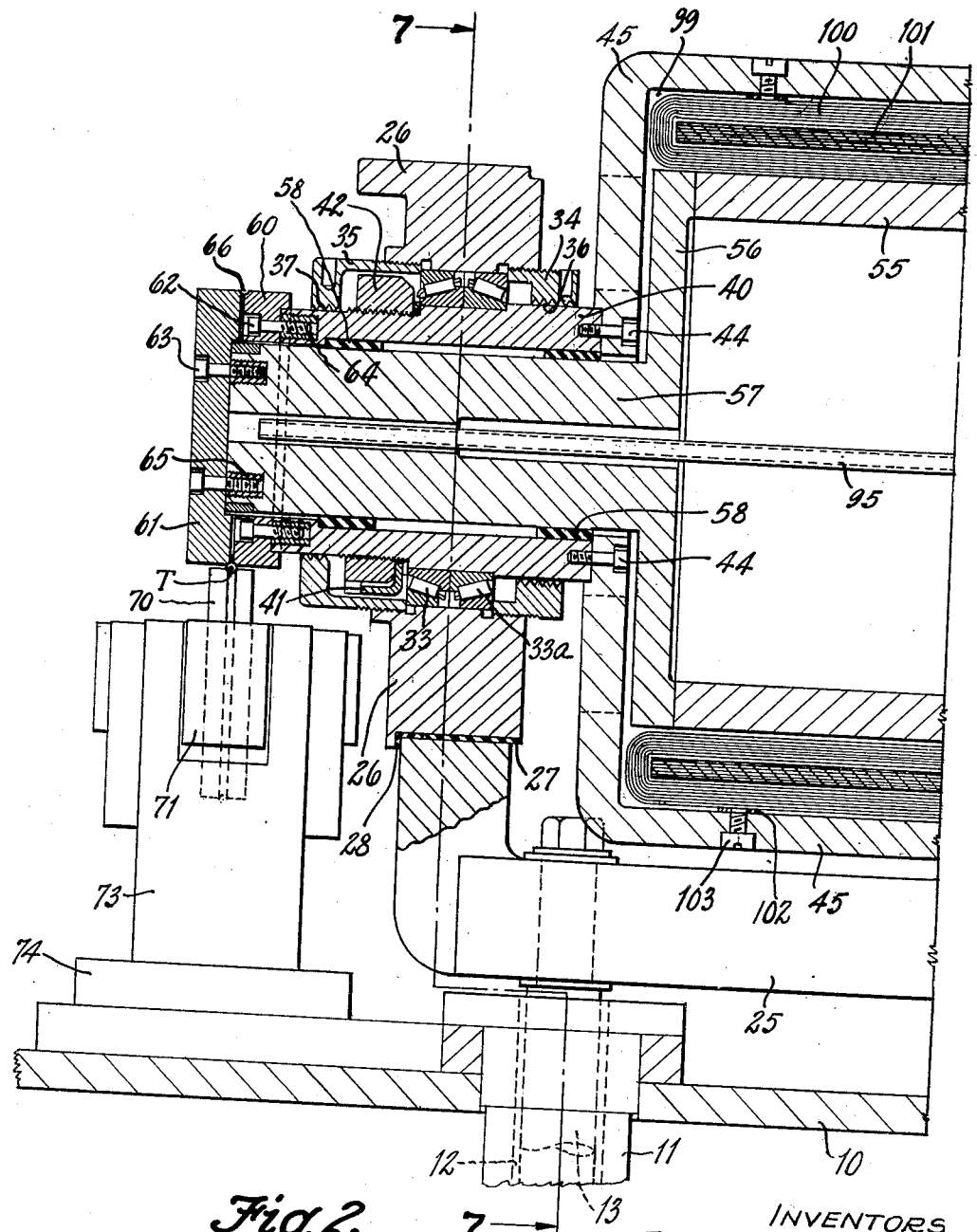

The electrodes 60 and 61 are separated by an air gap and shaped to provide a peripheral groove 66 which receives the tubing T which has been formed by shaping a strip of steel into a cylinder with a butt seam extending longitudinally of the tubing and this apparatus is designed to weld this seam. The tubing T is urged against the electrodes by a roll 70 supported below the tubing as shown in Figs. 1 and 2, journaled in a lever 71 pivotally supported at 72 by a standard 73 extending upwardly from the base 74. The roll is urged upwardly against the tubing with substantially constant force exerted by air pressure within a bellows contained in a housing 75 which is supported by the base 74. The details of the supporting or back-up roll 70 and the mechanism for causing it to exert a substantially constant pressure on the tubing to be welded are disclosed in the patent to R. I. Hahn et al. No. 2,492,572, granted December 27, 1949. The details of this mechanism constitute no part of the present invention.

Electrode rolls 60 and 61 are initially larger in diameter than shown. For example, the initial size of the rolls shown in Fig. 2 may be that represented by the dot-dash circle 68 in Fig. 1. To accommodate electrodes of such diameter, it is necessary to elevate the frame 25 (Figs. 2 and 3) so that the axis of the electrodes and supported shafts will be initially that represented by the dot 67 (Fig. 1). The supporting member 26 is designed to support apparatus for trimming and grooving the electrodes. This apparatus is not shown because it forms no part of this invention, but may be of the same construction as that shown in the patent to Nichols 2,293,846, granted August 25, 1942. This operation of trimming and grooving the electrodes is necessary because of the fact that during the continued use of the machine, the tube receiving groove becomes roughened and worn out of true due to the intense heat of the electric current and must be trued or resurfaced in order for the device to continue to operate properly.

Rotation of the electrodes during the welding operation is effected by the traction between the longitudinally moving tubing and the electrodes, said traction being effective due to the pressure exerted by the back-up roll 70. For trimming and grooving the electrodes when the welder is not in use, the electrodes are rotated by means of an electric motor 80 (Fig. 4) which drives a grooved pulley 81 connected by a belt 82 with a pulley 83, which, as shown in Fig. 3, is provided with a bearing bushing 84 journaled on a disc 85 supported by shaft 50. Pulley 83 carries pins 86 (Fig. 4) which pivotally supports pawls 87 urged by springs 88 toward a ratchet 89 connected with shaft 50 in any suitable way. Ratchet 89 is retained in the position shown by washers 90 and 91 (Fig. 3) which are engaged by a flange formed on a plug 92 screwed into the shaft 50.

As previously stated, the inner drum of the transformer secondary is supplied with water for cooling purposes and to this end the plug 92 has formed therein a water inlet duct 93 which connects with a water inlet passage 94 extending to a source of supply. The passage or duct 93 also communicates with a pipe 95 which extends to a point near the left end of shaft 57 so that the incoming water is discharged against the electrode 61. The discharged water flows to the right through the shaft 57 and partly fills the drum 55, the excess flowing out through the duct 96, formed in the plug 92 and a discharge passage 97 formed in a coupling member 98, secured to the plug 92 and in which the water supply passage 94 is also formed. The drum 55 and the shaft 50 retain a substantial quantity of water at all times during the operation of the apparatus. This water conducts away heat without being brought up to the boiling point since cold water is flowing in to maintain the level of water at about the axis of the drum.

The annular space 99 between the drums 45 and 55 receives the primary transformer winding 100 which is wound around a relatively thin core 101 as shown in Figs. 2 and 3. This core is made by winding a thin ribbon of silicon steel into a hollow cylinder. As already stated, this steel is of a type known to the trade as "Hipersil Type C." The core 101 has relatively low reluctance to change in flux density and is capable of high saturation, so that it is responsive to high frequency current on the order of 960 cycles. The primary winding 100 of insulated wire is encircled by bands 102 which are fixed to the inside wall of the drum 45 by screws 103 and which space said primary winding from the drum 45.

The lead wires 104 and 105 (Fig. 3) of the coil 100 are connected with copper rings 106 and 107 which are secured by screws 108 to a non-conducting annular plate or ring 109 of suitable insulating material attached to the annular member 47. Each of the rings is engaged by two brushes 111 movable in brush holders 112, pairs of which are attached to each of copper plates 114 and 115 and leaf springs 113 urge the brushes toward the rings. The brush holders 112 are attached to the plates 114 and 115 by bolts 115a or other means and the plates are secured in any suitable way to a supporting bracket 116 (Fig. 3), supported by a non-conducting plate 117, to which it is secured in any suitable way. The plate is secured by bolts or other suitable means to a supporting bracket 118 which is attached by screws 119 to the bracket 20. The brushes are held in contact with the rings 106 and 107 by leaf springs 113, each of which is secured at one end to a pin 113a carried by the brush holder and at the other end engages the brush as shown in Fig. 6.

The brushes are connected by pig-tails 120 to pairs of conducting posts 121 and 122, attached, respectively, to the plates 114 and 115. One of each of the pairs of posts 121 and 122 is connected respectively with wires 123 and 124 which are connected with a source of alternating current, of such high frequency as desired, 960 cycles for example.

This apparatus is particularly adapted for use in practising the method of high frequency welding disclosed in the copending application of Donald P. Worden et al., Serial No. 218,572, filed March 31, 1951.

The advantages of the transformer which constitutes a part of the welding apparatus disclosed are several. The Hipersil steel ribbon, which is only approximately .005" thick and independently insulated, has the effect of reducing eddy current loss. A further advantage resides in the fact that Hipersil will carry in the same volume of material 35% more magnetic flux density with approximately 25% less total core loss, as compared to standard grades of transformer steel.

Further beneficial results are brought about by the construction of the primary winding. The winding comprises a number of groups having a minimum number of turns per group, connected in series. For example, there may be 21 groups of 3 turns each and 11 groups of 2 turns each, an arrangement which gives excellent results. By limiting the number of turns in each group to a practical minimum, the reactance resulting from leakage is kept at a minimum, because leakage reactance varies approximately as the square of the number of turns per group.

By use of the core of Hipersil steel and a primary winding arranged as disclosed, electrical losses are reduced to a minimum and the power of the transformer is increased. For example, a transformer constructed as disclosed has approximately twice the power rating of a transformer constructed in accordance with the disclosure of the Nichols patent previously referred to and the total core loss at 400 volts supply voltage is approximately 116, while the total loss, core loss plus other losses is approximately 650 watts.

Another beneficial result arises from the fact that a relatively large and unobstructed drain is provided for the cooling water so that there is a considerable flow of cooling water during operation of the device increasing the cooling effect.

It will be understood that the welding apparatus disclosed can be constructed with a transformer core formed of a standard grade of transformer steel, but such apparatus would be less efficient than when a core of "Hipersil" steel is employed, as has been previously indicated.

While the embodiment of the present invention as herein disclosed constitutes a preferred form, it is to be understood that other forms might be adopted.

What is claimed is as follows:

1. An electric welding apparatus comprising a pair of electrodes connected with a source of A. C. current of relatively high frequency and separated by an air gap, said apparatus having a transformer including a primary winding comprising a plurality of loops of insulated wire, each of which has a plurality of turns, surrounding a cylindrical core formed of "Hipersil" steel and a secondary comprising a pair of concentric, spaced drums between which the primary winding is positioned, one of said drums being connected to each of said electrodes, and means for holding the article to be welded against said electrodes adjacent the air gap with a substantially constant pressure.

2. An electric welding apparatus comprising a pair of electrodes connected with a source of A. C. current of relatively high frequency and separated by an air gap, said apparatus having a transformer including a primary winding surrounding a steel core and a secondary comprising a pair of concentric, spaced drums between which the primary winding is positioned, and of such dimensions that a reservoir of substantial size is formed within the inner drum, means for holding the article to be welded against the electrodes adjacent the air gap with a substantially constant pressure and means for circulating water through the space within said inner drum during the welding operation to prevent over-heating of the transformer and electrodes, said last named means including a water supply conduit which discharges the cooling water against one of said electrodes.

3. An electric welding apparatus comprising a pair of rotatable electrode discs connected with a source of A. C. current of relatively high frequency and separated by an air gap, said discs being cut away adjacent the air gap to form a groove adapted to receive a tube having a butt seam to be welded, means for holding the tube against the electrodes with the seam adjacent the air gap with a substantially constant pressure, a transformer having a secondary formed of two spaced concentric rotatable drums, concentric shafts spaced and insulated from each other, one of which is connected to each of said drums, and each of which is rotatably supported, and means for connecting one of said electrode discs to each of said shafts.

4. An electric welding apparatus comprising a pair of rotatable electrode discs connected with a source of A. C. current of relatively high frequency and separated by an air gap, said discs being cut away adjacent the air gap to form a groove adapted to receive a tube having a butt seam to be welded, means for holding the tube against the electrodes with the seam adjacent the air gap with a substantially constant pressure, a transformer having a secondary formed of two spaced concentric rotatable drums, concentric shafts spaced and insulated from each other, one of which is connected to each of said drums, and means for adjustably connecting one of said electrode discs to each of said shafts whereby the width of the air gap between the electrodes can be adjusted as desired.

5. An electric welding apparatus comprising a pair of rotatable electrode discs connected with a source of A. C. current of relatively high frequency and separated by an air gap, said disc being cut away adjacent the air gap to form a groove adapted to receive a tube having a butt seam to be welded, means for holding the tube against the electrodes with the seam adjacent the air gap with a substantially constant pressure, a transformer having a secondary formed of two spaced concentric rotatable drums, concentric shafts spaced and insulated from each other, one of which is connected to each of said drums, means for securing one of said electrode discs to the end of each of said shafts, said inner shaft having a central bore extending from the inner drum to the electrode disc secured to said shaft, and a water supply conduit extending into said bore and discharging cooling water against said last named electrode disc.

6. An electric welding apparatus comprising a pair of rotatable electrode discs connected with a source of A. C. current of relatively high frequency and separated by an air gap, said discs being cut away adjacent the air gap to form a groove adapted to receive a tube having a butt seam to be welded, means for holding the tube against the electrodes with the seam adjacent the air gap with a substantially constant pressure, a transformer having a secondary formed of two spaced concentric rotatable drums, one of which is connected to each of said electrodes and each of which is rotatably supported and a primary winding comprising a plurality of loops of insulated wire surrounding a core formed of a relatively thin ribbon of "Hipersil" steel wound in the form of a cylinder and positioned in the annular space between said concentric drums.

7. An electric welding apparatus comprising a pair of rotatable electrode discs connected with a source of A. C. current of relatively high frequency and separated by an air gap, said discs being cut away adjacent the air gap to form a groove adapted to receive a tube having a butt seam to be welded, means for holding the tube against the electrodes with the seam adjacent the air gap with a substantially constant pressure, a transformer having a secondary formed of two spaced concentric rotatable drums, one of which is connected to each of said electrodes and a primary winding positioned in the annular space between said concentric drums, said winding comprising a plurality of groups of connected wire loops each having a relatively small number of turns which are wound around a steel core formed of a thin ribbon of "Hipersil" steel wound in the form of a cylinder.

8. An electric welding apparatus comprising a pair of electrodes connected with a source of A. C. current having a frequency of at least approximately 960 cycles and separated by an air gap and a transformer having a secondary comprising a pair of concentric drums, one of which is connected to each of said electrodes and separated from each other to form an annular space between said drums and a primary winding surrounding a core formed of a relatively thin ribbon of "Hipersil" steel wound in the form of a cylinder and positioned in the annular space between said concentric drums.

9. An electric welding apparatus comprising a pair of electrodes connected with a source of A. C. current of relatively high frequency and separated by an air gap and a transformer having a secondary comprising a pair of concentric drums, one of which is connected to each of said electrodes and separated from each other to form an annular space between said drums and a primary winding positioned in the annular space between said concentric drums, said winding comprising a plurality of groups of connected wire loops each having a relatively small number of turns which are wound around a steel core formed of a thin ribbon of "Hipersil" steel wound in the form of a cylinder, and said loops of wire having different numbers of turns therein.

10. An electric welding apparatus comprising a pair of electrodes connected with a source of A. C. current of relatively high frequency and separated by an air gap, and a transformer having a secondary comprising a pair of concentric drums, one of which is connected to each of said electrodes and separated from each other to form an annular space between said drums, and a primary winding positioned in the annular space between said concentric drums, said winding comprising a group of connected wire loops, each loop having a relatively small number of turns and a second group of wire loops each of which has a lesser number of turns than the loops of the first group, all of said wire loops being wound around a cylindrically shaped core of "Hipersil" steel.

11. An electric welding apparatus comprising a pair of electrodes connected with a source of A. C. current of relatively high frequency and separated by an air gap, and a transformer having a secondary comprising a pair of concentric drums one of which is connected to each of said electrodes and separated from each other to form an annular space between said drums, and a primary winding positioned in the annular space between said concentric drums, said winding comprising a group of connected wire loops each loop having three turns, and a second group having a different number of wire loops each of which has only two turns, all of said wire loops being wound around a cylindrically shaped core of "Hipersil" steel.

12. An electric welding apparatus comprising a pair of rotatable electrode discs connected with a source of A. C. current of relatively high frequency, and separated by an air gap, a transformer comprising a primary winding surrounding a steel core and a secondary comprising a pair of concentric spaced drums between which the primary winding is positioned, a pair of spaced concentric shafts extending from said drums, each of which supports one of said electrode discs and means for adjusting the position of said discs on the suporting shafts, whereby the width of the air gap can be varied as desired.

13. An electric welding apparatus comprising a pair of rotatable electrode discs separated by an air gap, a transformer comprising a primary winding surrounding a steel core and a secondary comprising a pair of rotatable concentric spaced drums between which the primary winding is positioned, a pair of concentric shafts extending from said drums and supporting said electrode discs, a plurality of separated metal plates rotatable with and supported on one of said drums, each of which is connected with one end of the primary winding, brushes engaging said plates, a fixed support for said brushes, means for connecting said brushes with a source of relatively high frequency A. C. current and means for rotating the transformer and electrode discs.

14. An electric welding apparatus comprising a pair of rotatable electrode discs separated by an air gap, a transformer comprising a primary winding surrounding a steel core and a secondary comprising a pair of rotatable concentric spaced drums between which the primary winding is positioned, a plurality of concentric shafts, one of which extends from each of said drums at one end thereof, a shaft extending from and supported by the inner drum at its opposite end, supporting standards at opposite ends of said transformer, one of said standards having a bearing in which the last named shaft is rotatably supported, a bearing mounted in the other of said standards for rotatably supporting the outer of said concentric shafts and means for rotating the transformer and electrode discs.

15. An electric welding apparatus comprising a pair of rotatable electrode discs separated by an air gap, a transformer comprising a primary winding surrounding a steel core and a secondary comprising a pair of rotatable concentric spaced drums between which the primary winding is positioned, a plurality of shafts one of which extends from each end of the inner drum, a hollow shaft extending from one end of the outer drum and surrounding one of said first mentioned shafts, supporting standards at opposite ends of the transformer, one of said standards having a bearing in which said last-named shaft is rotatably supported, a bearing mounted in the other of said standards in which one of the shafts extending from the inner drum is rotatably supported, and means for rotating the transformer and electrode disks.

References Cited in the file of this patent

UNITED STATES PATENTS

| Number | Name | Date |
| --- | --- | --- |
| 1,478,262 | Snodgrass, et al. | Dec. 18, 1923 |
| 2,241,015 | Hunter | May 6, 1941 |
| 2,293,846 | Nichols | Aug. 25, 1942 |
| 2,492,572 | Hahn et al. | Dec. 27, 1949 |
| 2,561,739 | Hunter | July 24, 1951 |

OTHER REFERENCES

Book, "Magnetic Circuits and Transformers" by E. E. Staff M. I. T., 1943, page 289. (Division 48.)